June 27, 1933.   W. JOSSELYN   1,915,497
CAMERA
Original Filed Oct. 28, 1929   2 Sheets-Sheet 1
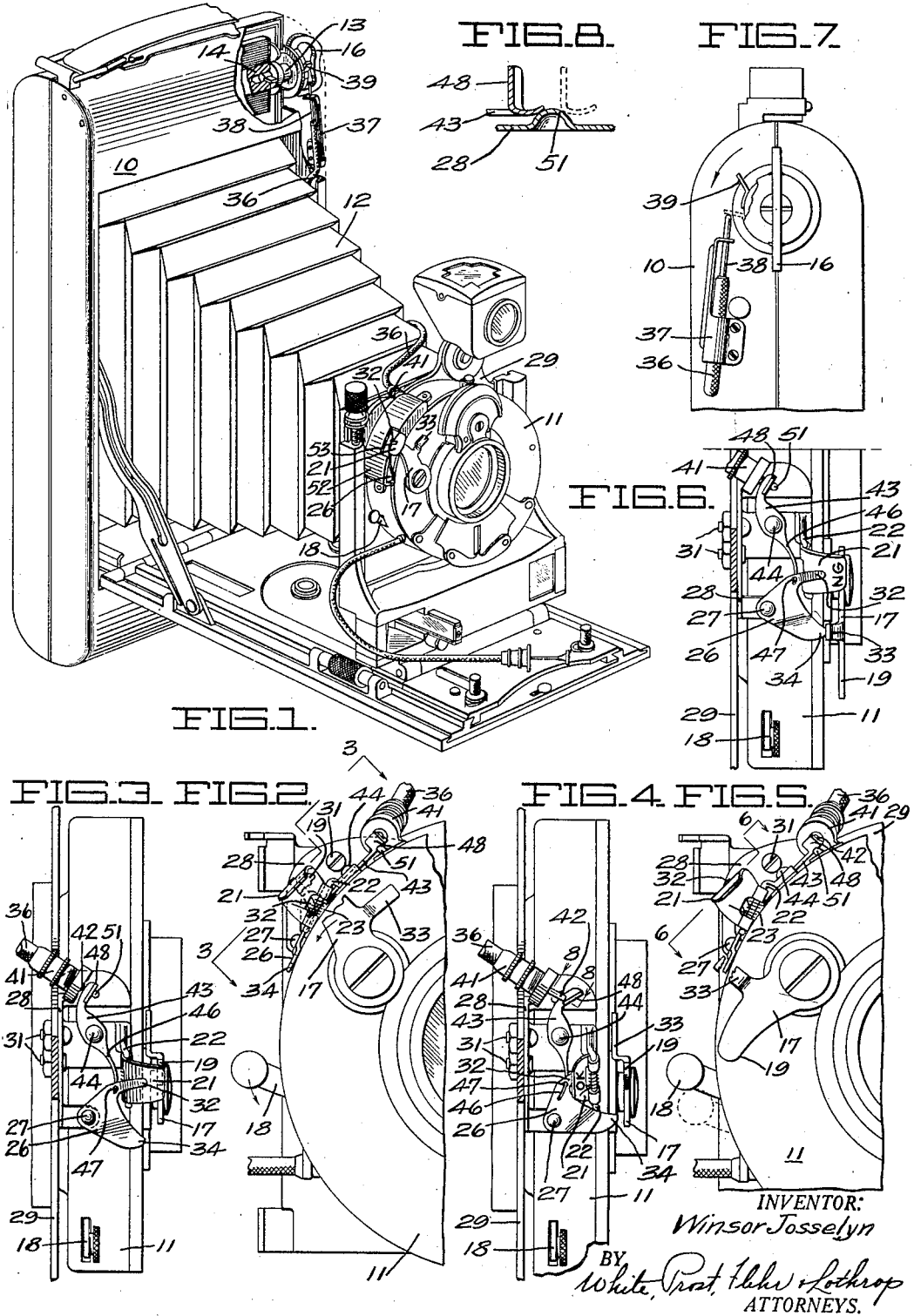
INVENTOR:
Winsor Josselyn
BY
White, Prost, Fhhr Lothrop
ATTORNEYS.

June 27, 1933.  W. JOSSELYN  1,915,497
CAMERA
Original Filed Oct. 28, 1929  2 Sheets-Sheet 2
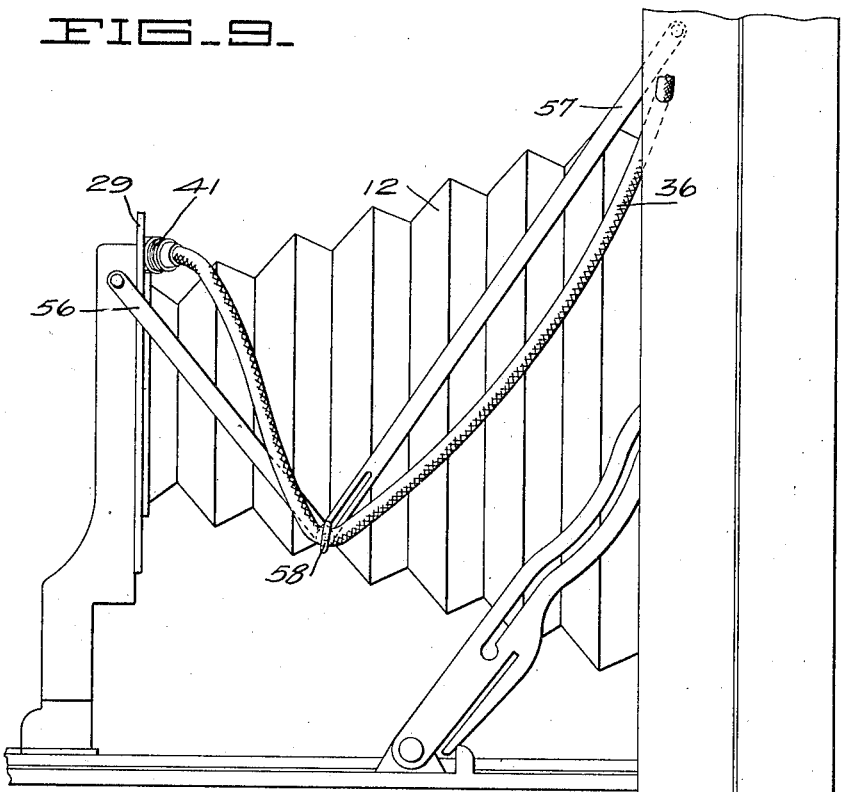
FIG_9_
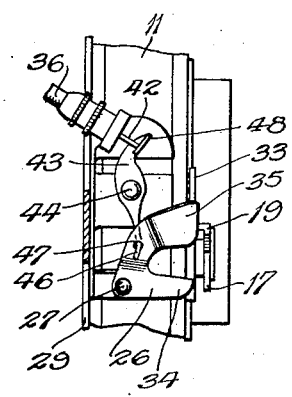
Fig. 10.
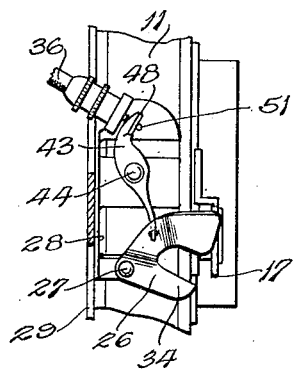
Fig. 11.
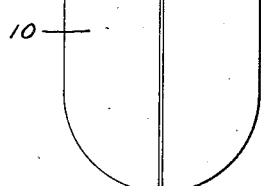
INVENTOR:
Winsor Josselyn
BY White, Prost, Fehr & Lothrop
ATTORNEYS.

Patented June 27, 1933

1,915,497

UNITED STATES PATENT OFFICE

WINSOR JOSSELYN, OF CARMEL, CALIFORNIA

CAMERA

Refiled for abandoned application Serial No. 402,952, filed October 28, 1929. This application filed January 27, 1932. Serial No. 589,290.

This invention relates generally to cameras of the portable type such as are employed for taking isolated exposures, and the present case is a refiling of my abandoned application, Serial No. 402,952, filed October 28, 1929.

It is a general object of the present invention to devise a novel structure which will preclude the possibility of an operator taking a double exposure.

It is a further object of this invention to devise novel mechanism cooperating with the operating lever of a camera shutter mechanism, which will automatically preclude improper operation of the shutter without, however, interfering with the normal shutter operations.

It is a further object of this invention to devise a novel form of guard for the operating lever of the camera shutter, together with novel means for its automatic operation.

Further objects of the invention will appear from the following description in which I have set forth the preferred embodiment of my invention. It is to be understood that the appended claims are to be accorded a range of equivalents consistent with the state of the prior art.

Referring to the drawings:

Fig. 1 is a perspective view illustrating a camera incorporating my invention.

Fig. 2 is an enlarged front view of a portion of the shutter incorporated in the camera of Fig. 1, and illustrating the construction of certain parts of the present invention.

Fig. 3 is a view of the mechanism shown in Fig. 2, as viewed from the line 3—3 of Fig. 2.

Fig. 4 is a view similar to Fig. 3, but illustrating the parts cooperating with the shutter lever, in a different operating position.

Fig. 5 is a view similar to Fig. 2, showing the shutter operating lever in depressed position.

Fig. 6 is a view illustrating the parts in the operating position shown in Fig. 5, and taken along the line 6—6 of Fig. 5.

Fig. 7 is a detail showing the rotatable member for rolling or winding up the film of the camera, together with its cooperating parts.

Fig. 8 is a cross sectional view taken along the line 8—8 of Fig. 4.

Fig. 9 is a fragmentary side elevational view of my device showing means for guiding the flexible motion transmitting cable.

Fig. 10 is a view similar to that of Fig. 2 illustrating a modification.

Fig. 11 is a view of the modification illustrated in Fig. 10 with parts of the device in a different operating position.

In my copending applications No. 355,879, filed April 17, 1929, now Patent No. 1,876,143, issued April 13, 1932, and No. 361,108, filed May 7, 1929, now Patent No. 1,850,460, issued March 22, 1932, I have disclosed mechanism for use in conjunction with portable cameras, which precludes the taking of double exposures. The specific means disclosed in those applications consists of latch or locking means, engaging a movable part of the shutter mechanism in such a manner as to lock the shutter after each operation thereof. This lock is then automatically disengaged when the operator moves an unexposed film portion in place of the exposed portion. In the present instance, I have disclosed a structure which will also preclude the taking of double exposures, but in place of means locking with a movable member of the shutter mechanism, I have shown a guard or equivalent member which is automatically moved to a position to overlie or protect the shutter operating lever, thus preventing its improper operation.

Referring to the drawings for a detailed description of the present invention, I have shown in Fig. 1 a camera consisting of the body portion 10, shutter mechanism 11, and a collapsible bellows 12 connecting the shutter mechanism with the body portion 10. As is customary with cameras of this type, the body portion 10 is constructed so as to house a photographic film, and means is provided which can be manually operated so that after exposure of a certain film portion, an unexposed portion can be moved into place to be exposed. This film changing means is preferably formed by a rotatable shaft 13, which is adapted to detachably engage one end of a roller 14. Shaft 13 is provided with a ring 16 or equivalent means whereby the shaft 13 and roller 14 can be rotated manually when desired. The unexposed film roll is of course carried in the other end of body portion 10, and as the film is exposed, it is wound up upon roller 14.

Shutter mechanisms for use with portable cameras are provided with manual means to effect a desired shutter operation, as for example a snapshot or a time exposure. In some instances the mechanism is operated by a single manually movable lever while in other cases the shutter is conditioned or tensioned by one lever and is released by another operating member. In the drawings the particular shutter mechanism illustrated is equipped with one lever which is depressed from an initial position to condition or tension the shutter mechanism, and another member is provided which is manually depressed for releasing the shutter. Upon releasing the shutter, the conditioning lever returns to initial position. The conditioning lever is indicated at 17 and is supported upon the housing of the shutter mechanism 11. In Figs. 1 and 2, lever 17 is shown in initial position. In operating the shutter, the lever is depressed to the position shown in Fig. 5 to tension or set the shutter mechanism. Member 18 is then depressed, as indicated by the dotted lines in Fig. 5, to release the shutter, and during the shutter operation, lever 17 returns to initial position. In taking a time exposure, lever 17 generally returns only part way back to its initial position when member 18 is first depressed, but upon depressing this member a second time, lever 17 returns to initial position. The outer end portion 19 of lever 17 is the part which is generally engaged by the thumb or finger of the operator.

In my invention I provide means in the form of a hood 21, adapted in one position to overlie portion 19 and thus preclude its normal engagement by an operator. This hood 21 can be formed of a piece of sheet metal bent or curved in the manner shown in Figs. 5 and 6. To permit movement of hood 21 between its operative or active position, and its out of the way or inactive position, one end of the hood is preferably pivotally mounted by means of pin or shaft 22. (Fig. 5.) For biasing the hood in one direction, a small helical spring 23 has been shown about shaft 22, and this spring is arranged to normally tend to rotate hood 21 as shown in Fig. 4, in which position it permits free access to portion 19 of lever 17. Its active position is shown in Figs. 2 and 3, in which it is swung forwardly to overlie portion 19, so that when lever 17 is in its normal or initial position, hood 21 precludes the operator from engaging lever portion 17.

To effect automatic operation of hood 21, I preferably provide means which will cause this hood to move to its active position responsive to movement of lever 17, as for example responsive to movement of this lever from its initial to its depressed position, and means is also provided for effecting automatic return of the hood to its inactive position when the operator moves an unexposed film portion in place of an exposed portion. As a suitable and desirable embodiment of means for effecting automatic movement of the hood to its active position, I provide a lever 26, pivotally mounted as by means of pin 27. It may be noted at this time that pivot pin 27, and also pivotal shaft 22, can be carried by portions of a small metal bracket 28, this bracket being in turn connected to the plate 29 of shutter mechanism 11, as by means of rivets or screws 31. Lever 26 is provided with a curved finger 32, and this finger is arranged to engage the back face of hood 21. Movement of lever 26 from the position shown in Fig. 4 to that shown in Fig. 3, serves to swing the hood forwardly from inactive to its active position. To effect such movement of lever 26 automatically responsive to movement of lever 17, this lever is provided with a small arm 33. The end portion 34 of lever 26 is adapted to extend into the path of movement of arm 33, so that when lever 17 is moved from its initial to its depressed position, arm 33 engages portion 34, thus rotating lever 26 in a clockwise direction as viewed in Fig. 4, to swing hood 21 forwardly to its active position. When lever 17 is fully depressed, portion 34 occupies the position immediately behind arm 33, thus effectively locking lever 26 and hood 21 in the position shown in Fig. 6.

In order to effect automatic movement of hood 21 back to its inactive position, I have shown means actuated responsive to rotation of shaft 13. This means preferably utilizes a flexible motion transmitting cable 36, such as are commonly used on portable cameras for operating shutter mechanisms. One end of this cable is retained by a clamp or bracket 37, secured to one side wall of the camera body portion 10. A pin 38 projects from this end of cable 36, and is arranged in the path of movement of a member 39, this member being rotatable together with shaft 13. When shaft 13 is rotated in a counterclockwise direction, as viewed in Fig. 7 as by engaging ring 16, pin 38 is repeatedly forced into cable 36, although since it escapes by member 39, it does not prevent rotation of shaft 13 to wind up the exposed film portion. The other end portion 41 of cable 36 extends forwardly to the shutter mechanism 11, and is shown mounted upon bracket 28. An actuating pin 42 extends from this end of the cable, and this pin is projected outwardly each time the pin 38 is forced inwardly by engagement with member 39. Biasing means is of course inherent with cable 36, so that pin 42 is normally biased toward retracted position, and so that pin 38 is normally biased toward projected position.

To cooperate between actuating pin 42 and lever 26, I provide another lever 43, this lever being pivotally connected to bracket 28 by means of pin 44. One end of this lever is formed to provide a curved finger 46, this finger extending loosely through an aperture 47 in lever 26. The other end portion 48 of lever 43, extends in the path of movement of actuating pin 42. In order to frictionally retain lever 43 in a shifted position after it has been actuated by pin 42, a small struck up portion 51 has been provided immediately below portion 48. It is apparent that because of the engagement of curved finger 46 with lever 26, levers 43 and 26 are constrained to rock in unison, but in opposite directions. It may be also noted that the pivotal axes provided by pins 27 and 44, are substantially normal to the pivotal axis afforded by pivotal shaft 22 for hood 21. In order to protect certain of the working parts, a small hood 52 can be provided, as shown in Fig. 1, this hood having a portion thereof cut away as indicated at 53 to permit free movement of guard 21.

In Fig. 9, suitable means is shown for properly guiding the motion transmitting cable 36, whereby this cable is properly folded within the camera when the camera is collapsed. Thus, I have shown links 56 and 57 pivotally connected to the shutter support and to the side wall of body portion 10 respectively, these links being associated by a pin and slot connection 58. An intermediate portion of the cable 36 is attached to links 56 and 57 at the point of connection 58 so that the cable is doubled downwardly when the camera is collapsed.

The operation of my device can be explained as follows. It will be presumed that an unexposed film portion is in proper position within the camera, and that hood 21 is in inactive position as shown in Fig. 4. Suitable lettering such as "O. K." can be placed upon the face of the hood now exposed to indicate that an exposure can be made. If the operator now desires to take an exposure, he depresses lever 17 to set the shutter mechanism. During movement of lever 17, arm 33 engages portion 34 of lever 26, and thus rotates lever 26 in a clockwise direction to the position shown in Fig. 6. Rotation of lever 26 causes finger 32 to swing hood 21 outwardly, and also lever 43 is rotated in a counterclockwise direction. While lever 17 remains in depressed position, lever 26 is locked, as shown in Fig. 6. The operator then depresses member 18 to effect an exposure, and lever 17 returns to its initial position. Portion 19 of lever 17 then underlies hood 21, as shown in Figs. 2 and 3, thus preventing or precluding its engagement by the finger of an operator. While the parts are thus positioned, it is impossible for the operator to effect a second exposure, upon the same film portion, without first rotating shaft 13. Suitable lettering such as "N. G." upon the side of the hood now exposed, provides a visual warning so that the operator will not attempt another exposure until the film has been changed.

Upon rotation of shaft 13 to wind up the exposed film portion, movement of pin 38 causes actuating pin 42 to be projected, to rotate lever 43 in a clockwise direction. Lever 26 correspondingly rotates in a counterclockwise direction, to permit hood 21 to withdraw under tension of spring 23. Lever 43 is of course retained in one or the other of its operating positions, by the friction occasioned by the detent or projection 51. After hood 21 has withdrawn in its inactive position, lever 17 can be again operated to effect another exposure. It will be noted that lever 17 is not obstructed in any way in its movement from depressed back to initial position. This is a desirable characteristic of the present invention, as it permits accurate timing of the shutter operation.

It is apparent that the details of the device described above are susceptible of modification and simplification. For example under certain conditions, I have found that the hood may be formed as a part of lever 26 by providing a suitable widened portion 35 on finger 32, as shown in Figs. 10 and 11. Other modifications may suggest themselves within the scope of the invention, as determined by the state of the prior art.

I claim:

1. In a camera, shutter mechanism including a movable member adapted to be manually actuated in effecting shutter operations, a guard movable to one position in which it precludes manual engagement of said member and to another position in which it permits such operation, and means for automatically moving said guard to said first named position for each operation of the shutter to expose a film portion.

2. In a camera, shutter mechanism including a movable member adapted to be manually actuated in effecting shutter operations, a guard movable to one position in which it precludes manual engagement of said member and to another position in which it permits such operation, and means actuated by movement of said member for moving said guard to said first named position.

3. In a camera having shutter mechanism with a manual operating member and also having a film changing member adapted to be manually moved for bringing an unexposed film portion in place of an exposed portion, a guard movable to a position in which it precludes operation of said first named operating member and also to a second out of the way position in which operation of said member is permitted, means for automatically moving said guard to said first named position for each operation of the shutter to expose a film portion, and means responsive to movement of said film changing member for moving said guard from said first position to said second position.

4. In a camera having shutter mechanism with a manual operating member and also having a film changing member adapted to be manually moved for bringing an unexposed film portion in place of an exposed portion, a guard movable to a position in which it precludes operation of said first named operating member and also to a second out of the way position in which operation of said member is permitted, means actuated by movement of said operating member for moving said guard from second position to said first position, and means responsive to movement of said film changing member for moving said guard from said first position to said second position.

5. In a camera having a shutter mechanism for taking isolated exposures, said mechanism including a lever movable from a normal position to a second position to condition the mechanism for an exposure, a guard pivotally supported adjacent said member, said guard in one position overlying one end of said lever and in another position exposing said end of the lever, and means for moving said guard to said one position responsive to movement of the lever from said initial position to its second position.

6. In a camera having a shutter mechanism for taking isolated exposures, said mechanism including a lever movable from a normal position to a second position to condition the mechanism for an exposure, a guard pivotally supported adjacent said member, said guard in one position overlying one end of said lever and in another position exposing said end of the lever, means for normally urging said guard towards said other position, and means actuated by said lever for moving said guard to said first named position responsive to movement of said lever from its initial to its second position.

7. In a camera having a shutter mechanism for taking isolated exposures, said mechanism including a lever movable from a normal position to a second position to condition the mechanism for an exposure, a guard supported adjacent said member and arranged to swing about a pivotal axis, said guard in one position overlying one end of said lever and in another position exposing said lever to manual operation, and means for moving said guard to said other position responsive to movement of the said lever from its initial to its second position, said means including a member extending into the path of movement of said lever.

8. In a camera having a shutter mechanism for taking isolated exposures, said mechanism including a lever movable from a normal position to a second position to condition the mechanism for an exposure, a guard supported adjacent said member and arranged to swing about a pivotal axis, said guard in one position overlying one end of said lever and in another position exposing said lever to manual operation, and means for moving said guard to said other position responsive to movement of the said lever from its initial to its second position, said means including a member extending into the path of movement of said lever, said last named member being pivotally mounted to swing about an axis substantially normal to the pivotal axis of the guard.

In testimony whereof, I have hereunto set my hand.

WINSOR JOSSELYN.